United States Patent [19]
Dennis

[11] 3,980,422
[45] Sept. 14, 1976

[54] OIL INJECTION MEANS FOR LIQUID FUEL BURNER

[75] Inventor: John S. Dennis, Lambertville, N.J.

[73] Assignee: HED Industries, Inc., Pennington, N.J.

[22] Filed: Aug. 11, 1975

[21] Appl. No.: 602,601

[52] U.S. Cl. .............................. 431/116; 431/215
[51] Int. Cl.² ........................................ F23M 9/06
[58] Field of Search ............... 431/115, 116, 215, 9

[56] References Cited
UNITED STATES PATENTS

| | | | |
|---|---|---|---|
| 2,813,578 | 11/1957 | Ferguson | 431/115 |
| 3,078,914 | 2/1963 | Bigelow | 431/115 |
| 3,174,526 | 3/1965 | Von Linde | 431/116 |
| 3,885,904 | 5/1975 | Feng | 431/215 X |

Primary Examiner—Edward G. Favors
Attorney, Agent, or Firm—Sperry and Zoda

[57] ABSTRACT

A burner for burning gasified liquid fuel such as oil, in which the fuel is gasified by being mixed with hot burned gases drawn from the combustion chamber, is provided in which the normal thermal stresses found in such burners due to the return of the hot burned gases for gasifying are substantially reduced and, at the same time, start-up time is reduced. Minimization of the thermal stresses is accomplished by utilizing the heat of vaporization of the oil or other fuel to cool the hot returning gases, and so limit thermal expansion, by having the gasification of the fuel commence at a preselected adjusted distance from the hot gas outlet of the burner, according to the particular application and ambient conditions in which the burner is installed. This permits elimination of a gasification chamber, which in some cases has been required to provide a preheating area for the oil, and so further reduces stresses. With such elimination, rapid start-up is provided by preliminarily burning ungasified fuel introduced by the air and fuel system of the principal unit. At the same time, maximum combustion efficiency is achieved through the capability of adjustable positioning of the point of injection of the fuel into the recycled hot burned gases.

8 Claims, 4 Drawing Figures

U.S. Patent  Sept. 14, 1976  3,980,422
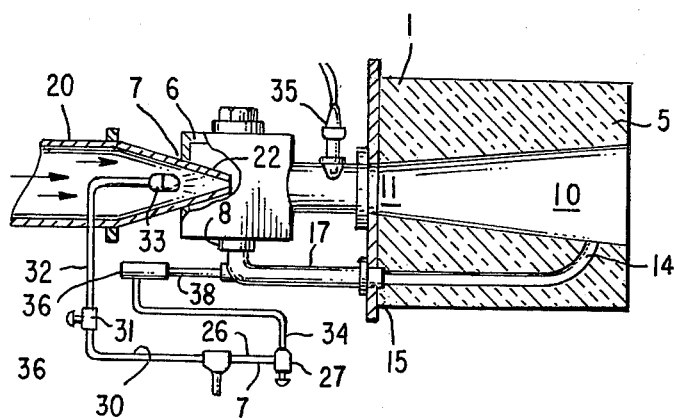

3,980,422

OIL INJECTION MEANS FOR LIQUID FUEL BURNER

BACKGROUND OF THE INVENTION

This invention relates to a burner in which a liquid fuel, such as oil, is first gasified, mixed with air, and then burned. Gasification occurs by mixing the fuel with hot burner gases coming from the burner chamber.

Burners using gasified fuel are not new, although the techniques for gasification, and the success of the techniques, has varied.

Gasification systems are shown in U.S. Pat. Nos. 2,197,347, and 3,308,868 where a portion of the oil is burned and used to gasify the remainder; U.S. Pat. Nos. 2,735,481 and 3,320,743 where the fuel is gasified by being mixed with heated air; and U.S. Pat. No. 3,361,183, where gasification is obtained by recirculating a portion of the combustion gases into admixture with the fuel and a Venturi is used to draw in the gasified fuel and the hot combustion gases. In addition, multiple burners, such as those adapted to burn different fuels, or to burn the same fuel in different ways, have existed. Examples of these are Reichhelm U.S. Pat. No. 3,308,868 and French Pat. No. 1,406,040.

In burners being used for gasifying fuel by mixing oil with hot products of combustion, such as that shown in Reichhelm U.S. Pat. No. 3,361,183, the gasification of the fuel is shown taking place in a separate chamber. This chamber has hot products of combustion entering the chamber at one inlet, liquid fuel entering it at another, and a mixture of the two being drawn out at an outlet port after gasification. It then goes into a mixing chamber for mixing with compressed air and into a burning chamber for burning. This structure, having a gasification chamber, can preheat for starting for the use of an electric heater around the gasification chamber. The structure, however, also results in undesirable thermal stresses due to the fact that the hot combustion gases must pass from the burning chamber to the gasification chamber. This method of preheat also takes a relatively long start-up time.

SUMMARY OF THE INVENTION

The problems discussed above have been effectively dealt with, basically, in U.S. Pat. No. 3,705,784 issued Dec. 12, 1972. That patent discloses a concept in which the inherent heat of vaporization of a gasifiable fuel, such as oil is used to reduce thermal stresses within a gasification type burner by reducing the temperature of the components most subject to stress. This is accomplished in U.S. Pat. No. 3,705,784 by injecting the liquid fuel into the hot combustion gas stream at an earlier point in the system's operation so that its heat of vaporization will be taken up sooner and so serve to reduce the temperature of the returned gases before thermal expansion occurs. This permits elimination of the gasification chamber, further reducing thermal stresses and also adding to compaction.

In U.S. Pat. No. 3,705,784, the fuel and air supply system is also integrally used to provide a start-up system for a cold burner using the fuel without gasification.

While the invention disclosed and claimed in U.S. Pat. No. 3,705,784 has, as indicated above, effectively overcome problems noted in gasification systems previously patented, it has been observed that certain problems still exist. Heretofore, as shown in U.S. Pat. No. 3,705,784, the liquid fuel was injected at a pre-selected location, in particular a location close to the inlet end of a return duct extending from the fire chamber to the chamber in which fuel and air are mixed. In some installations, this particular location has been found to be the optimum one; however, this may be so only by chance, that is, in other installations ambient conditions, and the particular application in which the burner is being used, produce conditions which make injection of the fuel at this particular location undesirable.

Further, it has been found that in previous gasification systems, including that shown in U.S. Pat. No. 3,705,784, it has been customary to inject the fuel that is to be gasified directly transversely of the flow direction of the recycled hot gases passing through the above-mentioned duct. This has proved to be unsatisfactory, in some instances, in that the liquid fuel has been blown back by the force of the recycled hot gases that are in flow from the fire chamber to the fuel-air mixing chamber. As a result, the liquid fuel so injected has been channeled, undesirably, into a laminar flow pattern along the wall of the return duct, affecting gasification adversely and producing a consequent failure in some instances to achieve maximum combustion efficiency.

To this end, the present invention is directed toward an oil injection means for burners of the type shown in U.S. Pat. No. 3,705,784, in which an accurate, swift adjustment can be made to meet each installation condition, by selective, adjusted positioning of the oil injection means within the return duct. In this way, the particular location at which the liquid fuel will be directed into the stream of hot gases flowing through the return duct from the fire chamber can be varied, from installation to installation, according to the conditions encountered, to make for maximum efficiency in gasification and, consequently, ultimate combustion of the gasified fuel. Further, the invention is designed to accomplish the injection of the liquid fuel through the medium of a sparging tube, coaxially aligned with the return duct, as a further step in the direction of perfect combustion.

DESCRIPTION OF THE DRAWINGS

The invention is best understood through reference to the drawings, as follows:

FIG. 1 is a schematic drawing showing flow and operation of the unit.

FIG. 2 is a perspective view of the burner.

FIG. 3 is a side elevation of the burner partially cut away in a section to show portions of the burning chamber and return gas duct.

FIG. 4 is an enlarged detail sectional view of the improved fuel injection means.

DETAILED DESCRIPTION OF THE INVENTION

Structure

The figures show the burner 1 which includes a burner block 5 made of a refractory material, such as ceramic, mixing area 6 and a fuel supply system 7.

Burner block 5 contains a generally conical burning chamber 10 leading from mixed fuel inlet 11 to discharge gas outlet 12 at the opposite end. At one side of chamber 10, proximate to the outlet 12, is a return port 14. Port 14 leads from chamber 10 rearwardly of the unit in the general direction of burner chamber inlet or throat 11, through the refractory material to an interconnecting point 15 where it leads to interconnecting means or duct 17, normally a metal pipe. The purpose of outlet 14 is to carry hot, burned gases, i.e., the products of combustion, from the end of burner chamber 10 back towards the mixing chamber 6, the gases being used to gasify or vaporize liquid fuel.

Mixing chamber 6 mixes the gasified fuel with combustion air and feeds it into the burning chamber 10. The air, under pressure, enters mixing chamber 6 through air inlet duct 20 and air inlet 7. Duct 20, as it approaches mixing chamber 6 is constructed to form a Venturi 22 within chamber 6 to create a suction in line 17. This suction serves to draw the hot burned gases from burning chamber 10 through outlet 14 into chamber 6.

The liquid fuel to be burned comes from a fuel source inlet 25. Source 25 branches to form fuel supply system 7. Branch 26 passes through metering valve 27 to a fuel outlet opening within interconnecting duct 17. Fuel for use in the start-up system, to be described below, follows duct 30 through valve 31 and duct 32 to nozzle 33 located just within the Venturi construction 22 in air inlet 20.

It should be noted that the oil outlet 28 opening within the interconnecting duct 17 is positioned proximate to the exit from the refractory material 5 near point 15. Preferably, it should be located as close to the refractory material as is practical, and in accordance with the invention, this is achieved while yet adjustably positioning the outlet 28 axially of the duct 17. The oil may be fed by either mechanical or gravity pressure, as is desired. The oil is mixed with the hot burned gas in interconnecting duct 17 at oil outlet 28. Duct 17 then carries the mixture of oil and hot combustion gases to mixing chamber 6; the mixture enters chamber 6 at burned gas and fuel inlet 8.

An electrically operated igniter plug 35 is located at the burning chamber inlet 11 or slightly toward the mixing chamber from that point. It has been found that by having the igniter 35 positioned slightly outside of, but before, the burning chamber, the plug has less tendency to become fouled by products of combustion.

It will be noted that the above structure permits elimination of the gasification chamber, (compare chamber 14 in Reichhelm U.S. Pat. No. 3,361,183). It will also be noted that the oil has been mixed with hot gas at a point much closer to the point of exit of hot gases from the refractory material (point 15; compare the liquid fuel inlet 21, FIG. 1, of the Reichhelm U.S. Patent No. 3,361,183). If the gasification chamber is eliminated, however, the electric preheater is also eliminated (compare heater 18 of Reichhelm U.S. Pat. No. 3,361,183); in its stead a completely distinct but integrally operating start-up unit identified by circuit 30 has been provided. This start-up unit is operatively associated with fuel supply system 7.

This start-up system is integral with the overall system using the same fuel source. It is adapted for sequential operation, i.e., operation of the start-up followed by operation of the principal gasifying system. The start-up unit has liquid fuel passing from source 25 through duct 30, valve 31 and duct 32 to nozzle 33 within, or proximate to, Venturi 22.

Between the metering valve 27 and the outlet 28 at which oil or other liquid fuel is discharged into the interconnecting duct 17, the fuel passes through a line 34 connected at its outlet 35 to the inlet end of a connecting fitting 36, having a threaded, axial bore 37 through which the fuel passes into a complementarily threaded tubular member 38, having a close, sliding fit in the axial bore 40 of a tubular support fitting 42 threaded for engagement in a threaded opening 44 of interconnecting duct 17. Tubular member 38 extends axially of and within the duct 17, terminating in a nozzle 46 of the sparging type defining the oil or other liquid fuel outlet 28.

At the point where the member 38 extends out of fitting 36, there is provided a cap nut 48, which is threadedly engaged with the fitting 36, and compresses a gasket 50 between the cap nut and fitting, said gasket being forced radially inwardly into sealing engagement about the circumference of the tubular member 38. A similar cap nut is utilized to compress a gasket into sealing relationship against support fitting 42 and the member 38, where the member 38 extends into the fitting 42.

Operation

Operation of the liquid fuel burner will be first described in the operating stage, and then the start-up aspects considered.

In operation, oil or other liquid fuel capable of being gasified enters the system from source 25 passes through duct 26 and valve 27 and is fed into the hot combustion gases by discharge from the sparging nozzle 46 into the interconnecting duct 17. Meanwhile hot gases, a portion of the total volume of combustion gases, have been taken from combustion chamber 10 through hot gas discharge port 14 passing through refractory block 5 to point 15 and then into interconnecting duct 17 and into mixing chamber 6. Air under pressure enters through air inlet 20 and passes through Venturi 22 into mixing chamber 6. The passage of the air through Venturi 22 creates a suction which draws the hot burned combustion gases through inlet 14 and duct 17 into mixing chamber 6. These hot combustion gases (mixed with and carrying gasified oil) are mixed with the air in chamber 6 and pass through burning chamber inlet 11 to be burned in chamber 10. Electrical plug 35 provides ignition. Most of the combustion gases are then discharged through discharge opening 12 with only a small portion returning through outlet 14.

As noted above, the oil is injected into interconnecting duct 17 as close to the source of hot gas as is practical. Since the oil, as with any vaporizable liquid, requires heat of vaporization, the heat energy necessary for the gasification of the liquid fuel comes from the hot burned gases from duct 14. Thus the gasification of the oil serves to cool the hot gases. By placing outlet 28 close to the source of hot gas, the cooling takes place early in interconnecting pipe 17 (note that "outlet" 28 is capable of being alternatively termed an "inlet" in the sense that this is the point at which fuel to be gasified is fed into the duct 17). Thus pipe 17, a gas delivery pipe, does not reach the usual red-hot temperature normally found in prior art structures. Reduction of the temperature of the duct 17 reduces its thermal expansion (the expansion primarily being in a longitudinal direction), and so reduces thermal stresses in the area between mixing chamber 6 and refractory material 5. This is particularly important at points of junction.

Interconnecting duct 17 must have sufficient length after injection of the oil to allow adequate time for gasification of the fuel, if a gasification chamber is not used. Determination of adequate length relative to quantities of returned gas used can readily be made by observing the color of the flame in burner chamber 10. If blue, adequate gasification has taken place; if yellow is present, it is likely that some of the fuel has remained liquid.

If duct 17 has sufficient length after outlet 28, relative to the volume and temperature of hot return gases in duct 17, substantially complete gasification will take place in duct 17 prior to the oil reaching mixing chamber 6. Under these circumstances and if there remains sufficient heat energy in the mixture entering inlet 13, additional liquid fuel may also be injected at nozzle 33 for enhanced heat capacity of the overall burner. This, then, would result in two-stage operation if all oil is gasified, but will have yellow in it if there is too much oil from nozzle 33 (acceptable under some circumstances).

Though gasification using hot, burned gases only appears to be preferable, the presence of air with the hot gas in duct 17 is not objectionable provided it does not cool the gas to the point of incomplete gasification of fuel (i.e., yellow flame) and provided that premature ignition does not occur.

When the burner unit is cold and needs to be started, feedback of combustion gases will not, of course, serve to gasify the oil being fed into the system. Consequently, some other method of preheating is necessary. In the present invention the start-up system is an integral part of the total system since it uses the same air supply, Venturi and fuel supply. The oil passes through ducts 30 and 32 through the nozzle 33 and is picked up by the air entering through the air inlet duct 20. It will be ignited by plug 35 and will burn in burning chamber 10. This start-up operation is essentially full operation of the burner, not just a pilot light, but uses ungasified fuel and so is less efficient.

Valves 27 and 31 are used to determine which oil supply system is used. At start-up, valve 31 is open and valve 27 closed, allowing the oil to flow to nozzle 33. Once the warm-up period is over, valve 27 is opened to permit oil to flow into interconnecting duct 17, and valve 31 is closed. If desired, valves 27 and 31 may be combined at inlet source 25 and may also be operated automatically by a sequence timing control. If, after start-up, two-stage gasification is to be used, both valves would be left open by an amount that will give desired combustion balance.

It has been found that a unit can be started in under half a minute to the point where the hot burned gases can vaporize the oil. One unit built has had a preheating time of approximately 16 seconds.

The feature of adjustability as shown to particular advantage in FIG. 4, is an important aspect of the present invention. In FIG. 4, it will be observed that one can adjust the tubular member 38 longitudinally of the duct 17, so as to correspondingly adjust the position of the sparging nozzle 46, that is, the position of the outlet 28 of the fuel into the duct 17, in a direction axially of the duct 17.

This is achieved by first backing up the sealing caps 48, so as to relieve the sealing pressure of the gaskets 50 against the member 38. Then, member 38 is grasped, at the exposed portion thereof located between fittings 36, 42 exteriorly of duct 17, and is rotated. This causes the member 38 to be shifted in an axial direction, due to its threaded engagement with the fitting 36, which is supported against rotation and axial displacement, by reason of its being mounted upon the tube 34.

Accurate, minute adjustments of the nozzle 46 longitudinally of duct 17 are thus permitted. After the nozzle 46 has been positioned at a selected position of adjustment longitudinally of said duct 17, the caps 48 are again turned home, to cause the gaskets 50 to be sealably compressed against the member 38, thus to prevent leakage of fuel or hot gases, and also to fixedly retain the member 38 in the selected position to which it has been axially adjusted in the manner described.

It is appropriate, in this connection, to consider the reasons for and the desirability of the adjustable positioning of the point 28 at which the liquid fuel is discharged into the duct 17 for gasification by the hot burned gases passing into the duct 17 from the burner block. In practice, it has been found that a burner constructed according to U.S. Pat. No. 3,705,784, while having remarkable efficiency for its intended purposes, is not designed to take into account a lack of constancy of the temperature profile in the return duct 17. Within said return duct, there is a temperature differential, between the "hot" end 15 and the "cool" end connected to the chamber 6. The temperature profile is not constant due to the conditions of the particular installation of the burner. For example, in some cases the burner may be used in an application in which its discharge gas outlet 12 opens into what may be appropriately termed an "infinite chamber", that is, a very large building space or the like. Under these conditions, in which the discharge through outlet 12 is into a very large, open space, the temperature differential or range between the inlet and outlet ends of duct 17 may be quite different from the differential that would obtain in a case in which the burner discharges at outlet 12 into a "finite chamber". A finite chamber would in this case be one that is of restricted size, and particularly adapted to retain heat in a highly concentrated condition. A finite chamber, thus, could be a chamber in which steel or other metals are to be melted.

In the case of a finite chamber, the temperature differential between the inlet and outlet ends of duct 17 may be quite different from that present when the burner is installed in heating relation to a very open or infinite chamber.

Further, the temperature differential between the hot and cool ends of the duct 17 may additionally be affected by ambient atmosphere surrounding the return duct.

Considering the above factors, one may now note that the point at which the liquid fuel is injected into hot burned gases recycled through duct 17, is one where there should be a particular temperature, found to be the optimum for gasification of said fuel. This point is readily determinable by visual observation and/or by the use of gas analysis equipment, in a manner to be described hereinafter.

It is also clear that this point will vary according to differing installation of application conditions described above. Therefore, it becomes desirable to permit adjustable presetting of the outlet 28 of the fuel oil into the duct 17. Even the adjustability of said outlet to a small extent, that is, over a comparatively small distance (perhaps one-fourth inch to one inch), may have a very pronounced effect upon efficiency of the gasification system.

The manner in which the efficiency of the gasification system can be checked varies according to particular installation requirements. For example, it can be checked visually, by observation of the flame within the fire chamber of the burner block. It is desirable that there be an absence of luminescent particles, and that the flame be as blue as possible.

At the other extreme, one may find that there is "coking", also observable by reason of the fact that there is a pronounced tendency to "luminesce".

It is also possible to use gas analysis equipment, a common expedient in checking the efficiency of burners. Such equipment measures carbon dioxide and oxygen, and can indicate fuel deficiencies and other changes in the gaseous make-up of the products of combustion, indicative of failure to achieve maximum combustion efficiency.

It thus becomes apparent that one can make careful adjustments in the positioning of the sparging nozzle 46 within duct 17, while maintaining a visual or equipment check upon the quality of the combustion within the burner block. As soon as an optimum setting of the nozzle has been achieved, the flame will be found to be at its highest quality. This setting, when found, is retained in the manner previously described, and can be kept until such time as the flame again shows deficiencies of the type described above. This operational characteristic, thus, permits one to achieve a relationship of the sparging nozzle to the path along which the hot products of combustion travel within duct 17, such as to assure that the fuel oil is discharged from said nozzle into the hot burned gases, at that location in duct 17 where the temperature of the gases is best for gasification purposes.

A second important characteristic of the present invention has to do with the correction of a tendency of the injected oil to become a laminar flow within the duct 17 after discharge from the liquid fuel supply tube into said duct. In the patents referred to above, and in particular in U.S. Pat. No. 3,705,784, the injection of the liquid fuel into the interconnecting duct 17 is in the transverse direction as regards said duct, that is, the oil is injected diametrically across the path of the hot burned gases flowing through the duct. This has produced undesirable effects, that is, it has been noticed that the oil is blown back and flows in the direction of the prevailing force of the hot burned gases, said oil or other liquid fuel flowing longitudinally of the duct 17 without achieving full gasification. This, in turn, has an undesirable effect upon the combustion within chamber 6.

In accordance with the present invention, the oil is discharged radially outwardly from a point located upon the axis of the duct 17, that is, the sparging nozzle 46 extends axially within the duct 17, discharging the liquid fuel radially outwardly over the full circumference of the duct 17 into the path of the hot burned gases, in a fine spray effective to product optimum gasification.

What is claimed is:

1. In a liquid fuel burner for burning a gasifiable liquid fuel such as oil and having reduced thermal stresses, said burner being of the type including a burner made of refractory material and having a fire chamber, said chamber having a fuel mixture inlet port, a burned gas removal port, and a hot burned gas feedback port, a mixing chamber for mixing said fuel and air, said mixing chamber being connected to said inlet port, a burned gas and fuel inlet to said mixing chamber, means directly interconnecting said burned gas removal port to said burned gas and fuel inlet, an air inlet to said mixing chamber for directing air under pressure into said mixing chamber, said air inlet including a Venturi for drawing burned gas and fuel into said chamber through said interconnecting means and said burned gas and fuel inlet, and a gasifiable liquid fuel inlet connected to said interconnecting means proximate to said refractory material, whereby said fuel will be gasified by hot burned gas as it passes through said interconnecting means and the heat of vaporization of said fuel will cool said hot burned gases, thereby reducing the temperatures thereof and reducing thermal stresses therein, the improvement comprising means for adjusting the position of said liquid fuel inlet longitudinally of the interconnecting means, toward and away from said refractory material.

2. An improvement in liquid fuel burners as in claim 1, wherein said liquid fuel inlet into the interconnecting means is at the discharge end of a tubular liquid fuel supply member adjustable axially of and within the interconnecting means.

3. An improvement in liquid fuel burners as in claim 1, wherein the liquid fuel inlet into the interconnecting means is in the form of a nozzle provided at the discharge end of a tubular member mounted within the interconnecting means for adjustment axially thereof.

4. An improvement in liquid fuel burners as in claim 3 wherein said nozzle is of the sparging type and discharges the liquid fuel in a direction radially outwardly from the axis of the interconnecting means into the path of the hot burned gases passing therethrough.

5. An improvement in liquid fuel burners as in claim 1 wherein said means for adjusting the position of the liquid fuel inlet includes an elongated tubular member having a discharge nozzle at one end defining said inlet of the liquid fuel into the interconnecting means, said tubular member extending coaxially of and within the interconnecting means and terminating at its discharge end in close proximity to the refractory material, a fitting mounted within the interconnecting means in which the tubular member is slidable axially of the interconnecting means for adjustable positioning of said liquid fuel inlet in respect to the burned gas removal port and the burned gas and fuel inlet, and means for retaining the tubular member in selected positions to which it is axially adjusted.

6. An improvement in liquid fuel burners as in claim 1, wherein the means for adjusting the position of the liquid fuel inlet comprises an elongated tubular member having a discharge nozzle at one end disposed within the interconnecting means and defining the liquid fuel inlet into the interconnecting means, said elongated tubular member projecting at its other end out of the interconnecting means, the tubular member being mounted in the interconnecting means for slidable and rotatable adjustment in a direction axially of the interconnecting means and tubular member, and support means for the second named end of the tubular member, providing a connection of said tubular member to a source of liquid fuel.

7. An improvement in liquid fuel burners as in claim 6, wherein said support means for the tubular member comprises a sleeve-like fitting having an axial, threaded bore, said other end of the tubular member being threadably engageable in said bore, said fitting being stationarily mounted exteriorly of the interconnecting means, whereby upon rotation of the tubular member within said bore of the support fitting said tubular member will be adjusted axially of and within the interconnecting means.

8. An improvement in liquid fuel burners as in claim 7, wherein said support fitting includes sealing means extending about the tubular member, said sealing means being adapted for relieving sealing pressure against the tubular member to permit rotatable adjustment of said tubular member, the sealing means being adapted to be tightened upon adjustment of the tubular member to a selected extent, to prevent leakage of liquid fuel and to retain the tubular member in selected positions to which it is adjusted longitudinally of the interconnecting means.

* * * * *